United States Patent
Ueda et al.

(10) Patent No.: US 10,539,944 B2
(45) Date of Patent: Jan. 21, 2020

(54) PROGRAMMABLE LOGIC CONTROLLER

(71) Applicant: OMRON Corporation, Kyoto-shi, Kyoto (JP)

(72) Inventors: Hiroaki Ueda, Otsu (JP); Hideki Harada, Kyoto (JP); Daisuke Wakabayashi, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 92 days.

(21) Appl. No.: 15/681,460

(22) Filed: Aug. 21, 2017

(65) Prior Publication Data

US 2018/0095442 A1  Apr. 5, 2018

(30) Foreign Application Priority Data

Sep. 30, 2016  (JP) ................. 2016-194340

(51) Int. Cl.
*G05B 19/05* (2006.01)
(52) U.S. Cl.
CPC .. *G05B 19/058* (2013.01); *G05B 2219/14053* (2013.01); *G05B 2219/15097* (2013.01)
(58) Field of Classification Search
CPC ....... G05B 19/054; G05B 19/058; G05F 1/30; G05F 1/40; G06F 11/0721
USPC ...................... 363/65, 97; 323/268, 271, 906
See application file for complete search history.

(56) References Cited

U.S. PATENT DOCUMENTS

| | | | | |
|---|---|---|---|---|
| 5,793,190 A | * | 8/1998 | Sahlstrom | H02M 1/34 323/222 |
| 6,081,104 A | * | 6/2000 | Kern | H02J 9/065 320/101 |
| 7,609,533 B2 | * | 10/2009 | Chuang | H02M 3/33523 363/19 |
| 8,344,546 B2 | * | 1/2013 | Sarti | G06F 1/30 307/64 |
| 8,566,631 B2 | | 10/2013 | Noda | |

(Continued)

FOREIGN PATENT DOCUMENTS

| | | |
|---|---|---|
| CN | 105409173 A | 3/2016 |
| CN | 105515821 A | 4/2016 |
| JP | 2014-160377 A | 9/2014 |

OTHER PUBLICATIONS

Pisit Wisutmetheekorn et al. "Analysis and design of a high power factor AC/DC converter with an active ripple filter", Power Electronics and Drive Systems 2009, Jan. 2, 2009, pp. 440-445, XP031614599, ISBN:978-1-4244-4166-2, Piscataway, NJ, USA.

(Continued)

*Primary Examiner* — Yemane Mehari
(74) *Attorney, Agent, or Firm* — Metrolex IP Law Group, PLLC

(57) ABSTRACT

A power supply circuit in a PLC includes a first node that receives a DC voltage with a first level, a second node that outputs a voltage for driving a control unit, wiring connecting the first and second nodes, a first rectifier on the wiring having a forward direction from the first node to the second node, a charger for charging and discharging, a first converter that converts a discharging voltage from the charger into a DC voltage with a second level lower than the first level and outputs the voltage, and a second rectifier connected between an output of the first converter and the second node to have a forward direction from the first converter to the second node.

4 Claims, 4 Drawing Sheets

(56) References Cited

U.S. PATENT DOCUMENTS

| | | | | |
|---|---|---|---|---|
| 9,806,561 B2* | 10/2017 | Navarro | ............... | H02J 9/061 |
| 9,831,824 B2* | 11/2017 | Gazit | ............... | G01S 3/7861 |
| 2006/0077046 A1* | 4/2006 | Endo | ............... | H04B 3/54 |
| | | | | 340/12.33 |
| 2007/0035975 A1* | 2/2007 | Dickerson | ............... | H02J 7/35 |
| | | | | 363/131 |
| 2010/0008397 A1* | 1/2010 | Johnson, Jr. | ............... | G01K 13/00 |
| | | | | 374/152 |
| 2010/0110731 A1* | 5/2010 | Murai | ............... | H02J 9/062 |
| | | | | 363/15 |
| 2012/0068541 A1* | 3/2012 | Anderson | ............... | H02J 9/061 |
| | | | | 307/66 |
| 2012/0074786 A1* | 3/2012 | Johnson, Jr. | ............... | H02J 9/062 |
| | | | | 307/66 |
| 2012/0306274 A1* | 12/2012 | Shetler, Jr. | ............... | H02J 9/062 |
| | | | | 307/64 |
| 2014/0231801 A1 | 8/2014 | Saito | | |
| 2015/0008744 A1 | 1/2015 | Navarro | | |
| 2016/0105337 A1 | 4/2016 | Hermans et al. | | |
| 2016/0132444 A1 | 5/2016 | Jaraudias et al. | | |

OTHER PUBLICATIONS

The extended European search report dated Feb. 23, 2018 in a counterpart European Patent application.

Chinese Office Action (CNOA) dated Sep. 25, 2019 in a counterpart Chinese Patent application.

* cited by examiner

PROGRAMMABLE LOGIC CONTROLLER

CROSS REFERENCE TO RELATED APPLICATIONS

This application claims priority from prior Japanese Patent Application No. 2016-194340 filed with the Japan Patent Office on Sep. 30, 2016, the entire contents of which are incorporated herein by reference.

FIELD

The disclosure relates to a programmable logic controller (PLC), and particularly, to a PLC including a power supply for creating data backup in the event of a power cut.

BACKGROUND

Typically, PLCs used for factory automation (FA) or other purpose create data backup in the event of a power cut.

For example, a power supply switching unit included in a PLC described in Japanese Unexamined Patent Application Publication No. 2014-160377 (Patent Literature 1) includes two power supply lines that are both connected in parallel to a direct current (DC) power supply. A DC-DC converter is connected to the first power supply line via a diode. This DC-DC converter lowers an input voltage (20 to 28 V) to 3.3 V, which is an operating voltage of a main circuit, and outputs this voltage as a constant voltage.

A capacitor, which serves as a power supply for a backup operation, is arranged between the second power supply line and a ground. The capacitor is connected to an input stage of the DC-DC converter via a switch. While the DC power supply is on, the above switch is off and the capacitor is disconnected from the DC-DC converter. When a power cut is detected, the switch is turned on to cause the DC-DC converter to generate a constant voltage for a predetermined period using the capacitor as its power supply.

CITATION LIST

Patent Literature

Patent Literature 1: Japanese Unexamined Patent Application Publication No. 2014-160377

SUMMARY

Technical Problem

In the above power supply switching unit described in Patent Literature 1, the DC-DC converter operates both during normal power supply and during power cut, creating an issue of heat generation in the DC-DC converter. This structure needs a relatively large heat sink, which increases the space to be used by the power supply switching unit.

In response to the above issue, one or more aspects are directed to a PLC that downsizes a power supply circuit for supplying a DC voltage to a main circuit both during normal operation and during power cut. Other issues and advantageous effects will be described below.

Solution to Problem

A programmable logic controller according to one or more aspects includes a control unit that controls a target device, and a power supply circuit. The power supply circuit includes a first node, a second node, wiring, a first rectifier, a charger, a first converter, and a second rectifier. The first node receives a DC voltage with a first level. The second node outputs a voltage for driving the control unit. The wiring connects the first node and the second node. The first rectifier is arranged on the wiring to have a forward direction from the first node to the second node. The charger performs charging and discharging. The first converter converts a discharging voltage output from the charger into a DC voltage with a second level that is lower than the first level, and outputs the DC voltage. The second rectifier is connected between an output of the first converter and the second node to have a forward direction from the first converter to the second node.

In the above structure, the control unit receives the power supply voltage through the above wiring during normal operation, in which the power supply voltage is fed to the first node. Thus, the second converter may not perform the conversion operation for the most time except during activation. This reduces heat generation in the second converter, and downsizes the power supply circuit further. At a power cut, the power supply to the control unit is automatically switched to the charger. This eliminates the switching control using a control signal described in Patent Literature 1.

In some embodiments, the power supply circuit further includes a second converter. The second converter converts a DC voltage that is fed to the first node into a DC voltage with a third level that is higher than the first level, and outputs the DC voltage with the third level to the charger as a charging voltage.

In the above structure, the charger can have a higher charging voltage, and thus can have a smaller capacity. This downsizes the power supply circuit further.

In some embodiments, the power supply circuit further includes a third rectifier connected between the first node and an input of the second converter to have a forward direction from the first node to the second converter.

In the above structure, the power supply circuit is prevented from being damaged when an external DC power supply is accidentally connected with a reversed polarity to the first node of the power supply circuit.

In some embodiments, the second converter includes a second converter circuit, a second voltage detection unit, and a second control circuit. The second converter circuit includes a second switching element, and generates and outputs a DC voltage with a level determined in accordance with a conduction ratio of the second switching element. The second voltage detection unit detects an output voltage from the second converter circuit. The second control circuit operates on a DC voltage fed to the first node, and controls a switching operation of the second switching element. The second control circuit stops the switching operation of the second switching element when the voltage detected by the second voltage detection unit reaches the third level, and starts the switching operation of the second switching element when the voltage detected by the second voltage detection unit decreases below the third level.

In the above structure, the second converter automatically stops the voltage conversion operation when the charging voltage of the charger reaches the third level. This reduces the power consumption of the PLC during normal operation, in which the power supply voltage is fed to the first node.

In some embodiments, the first converter includes a first converter circuit, a first voltage detection unit, and a first control circuit. The first converter circuit includes a first switching element, and generates and outputs a DC voltage with a level determined in accordance with a conduction ratio of the first switching element. The first voltage detection unit detects an output voltage from the first converter circuit. The first control circuit operates on a discharging voltage output from the charger, and controls a switching operation of the first switching element. The first control circuit stops the switching operation of the first switching element when the voltage detected by the first voltage detection unit reaches the second level, and starts the switching operation of the first switching element when the voltage detected by the first voltage detection unit decreases below the second level.

In the above structure, the first converter automatically stops the voltage conversion operation when the output voltage from the first converter reaches the second level. This reduces the power consumption of the PLC during normal operation, in which the power supply voltage is fed to the first node.

In some embodiments, the charger includes a capacitor. The capacitor performs charging and discharging. The charger including the capacitor can further downsize the PLC and reduce the cost of the PLC.

Advantageous Effects

The PLC according to one or more aspects can downsize the power supply circuit.

DETAILED DESCRIPTION

Figure 1:
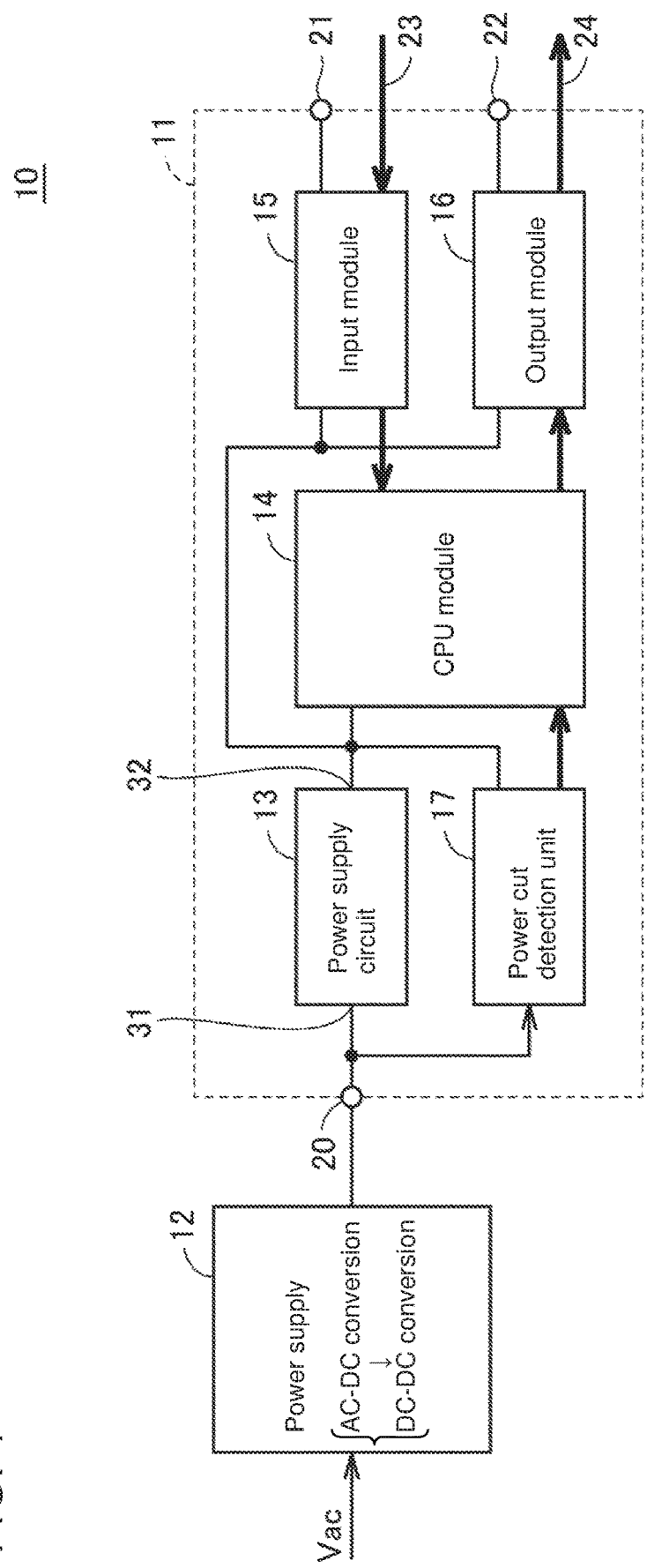
FIG. 1 is a block diagram illustrating an example overall configuration of a PLC.

Embodiments will now be described in detail with reference to the drawings. The same or corresponding components in the figures are given the same reference numerals, and will not be described redundantly.

Overall Configuration of PLC

FIG. 1 is a block diagram showing an example overall configuration of a programmable logic controller (PLC). As shown in FIG. 1, the PLC 10 includes a PLC unit 11 and a power supply 12. The power supply 12 converts an alternating-current (AC) voltage input from an external unit into a direct-current (DC) voltage, and then converts this DC voltage into a DC voltage with a predetermined level as appropriate, and outputs the resultant DC voltage. The power supply 12 may be a general-purpose power supply. The PLC 10 may additionally include one or more input-output units (not shown).

The PLC unit 11 includes a power supply circuit 13, a central processing unit (CPU) module 14, an input module 15, an output module 16, a power cut detection unit 17, and power supply terminals 20, 21, and 22.

The power supply terminal 20 receives a DC voltage fed from the power supply 12. The DC voltage is fed to the CPU module 14, the power cut detection unit 17, and parts of the input module 15 and the output module 16 through the power supply circuit 13. To create backup data at a power cut, the power supply circuit 13 can feed an operating voltage to these modules for a predetermined period after the power cut. The power supply circuit 13 will be described in detail with reference to FIG. 2.

The input module 15 imports input data 23 representing data including various detection results from one or more control target devices. The output module 16 outputs output data 24 for controlling a control target device in accordance with a command from the CPU module 14. The power supply circuit 13 feeds an operating voltage to circuit portions of the input module 15 and the output module 16 that need data backup at a power cut. The other circuit portions of the input module 15 and the output module 16 operate on a DC voltage fed through the power supply terminals 21 and 22.

The CPU module 14 performs arithmetic operations using the input data 23 received through the input module 15, and outputs the output data 24 resulting from the operations through the output module 16. In other words, the CPU module 14 functions as a control unit for controlling one or more control target devices.

The CPU module 14 includes typical microcomputers (also referred to as microcontrollers), such as a CPU, a random access memory (RAM), a read only memory (ROM), and a nonvolatile memory. The CPU module 14 may further include a circuit including an application specific integrated circuit (ASIC) or a field programmable gate array (FPGA).

The power cut detection unit 17 monitors the voltage level of the DC voltage input from the power supply terminal 20, and outputs a signal for notifying a power cut to the CPU module 14 when the voltage level of the input DC voltage decreases below a reference level. When the CPU module 14 receives a power cut notification from the power cut detection unit 17, the CPU module 14 stores data representing the state of the device immediately before the power cut into a built-in nonvolatile memory (not shown). The data is to be used for recovery from the power cut. The power supply circuit 13 includes a capacitor that serves as a power supply for operating the CPU module 14 and other modules during the data backup.

Configuration of Power Supply Circuit

Figure 2:
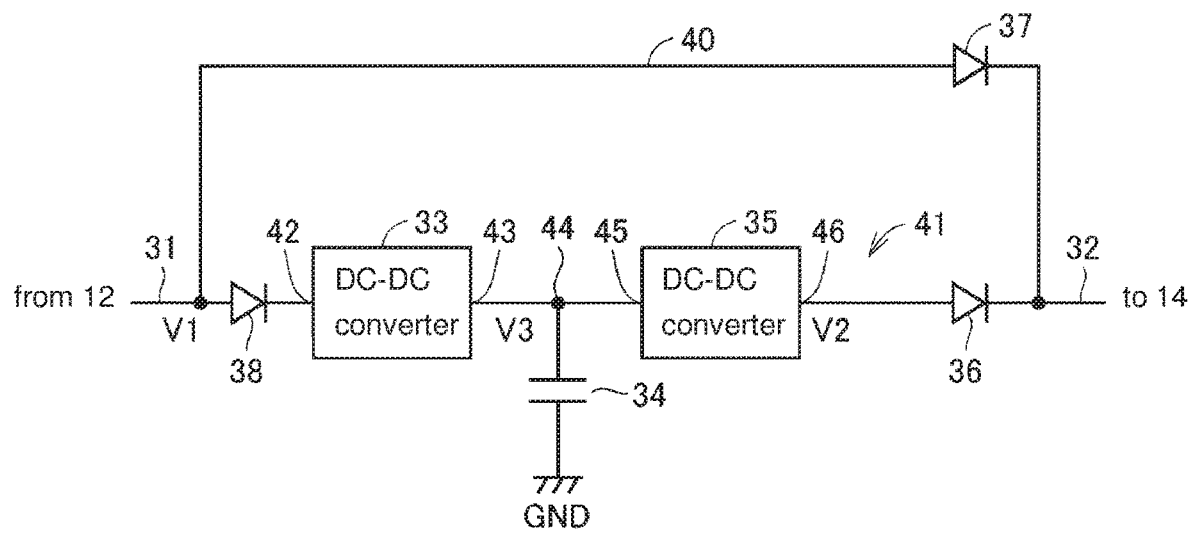
FIG. 2 is a block diagram illustrating a configuration of a power supply circuit, such as in FIG. 1.

FIG. 2 is a block diagram showing the configuration of the power supply circuit shown in FIG. 1. As shown in FIG. 2, the power supply circuit 13 includes a voltage input node 31 as a first node (node), a voltage output node 32 as a second node, wiring 40, DC-DC converters 33 and 35, a capacitor 34 as a charger, and diodes 36, 37, and 38 as rectifiers.

The voltage input node 31 is connected to the power supply terminal 20 in FIG. 1, and receives a DC voltage with a voltage level V1 from the power supply 12. The voltage output node 32 outputs a DC voltage for driving the CPU module 14 and other modules.

The DC-DC converter 33 raises the DC voltage with the voltage level V1 input to the voltage input node 31 to a DC voltage with a voltage level V3, and outputs the resultant DC voltage. The DC-DC converter 33 may be of any type. For example, the DC-DC converter 33 may be a non-isolated converter such as a step-up chopper, or an isolated converter such as a forward converter.

The capacitor 34 is connected between wiring connecting the DC-DC converters 33 and 35 and a ground GND. The capacitor 34 is used as a charger for charging the output voltage from the DC-DC converter 33 and for discharging the charged voltage. The voltage discharged from the capacitor 34 is input into the DC-DC converter 33. The capacitor is appropriately used for feeding power for a backup operation in a PLC, which is to be downsized and to be at low cost.

The capacitor 34 may be of any type of capacitor that can charge electric energy for a period during which a data backup operation is to be performed at a power cut. The power supply circuit 13 with the structure shown in FIG. 2 feeds a voltage raised by the DC-DC converter 33 to the capacitor 34 to allow more electric energy to be stored in the capacitor 34. In this case, the capacitor 34 can have a smaller capacity.

The DC-DC converter 35 converts the voltage discharged from the capacitor 34 into a DC voltage with a voltage level V2, which is lower than the voltage level V1, and outputs the resultant voltage. The DC-DC converter 35 may be of any type. For example, the DC-DC converter 35 may be a non-isolated converter such as a step-down chopper, and an isolated converter such as a flyback converter.

The diode 36 is connected between an output node 46 of the DC-DC converter 35 and the voltage output node 32. The diode 36 has a forward direction from the DC-DC converter 35 to the voltage output node 32.

The diode 38 is connected between the voltage input node 31 and an input node 42 of the DC-DC converter 33. The diode 38 has a forward direction from the voltage input node 31 to the DC-DC converter 33. The diode 38 prevents the DC-DC converters 33 and 35 from being damaged when a power supply with a reversed polarity is accidentally connected to the power supply terminal 20. The diode 38 is optional.

The wiring 40 is an alternative current path connecting the voltage input node 31 and the voltage output node 32 in parallel to a current path 41 connecting the diode 38, the DC-DC converters 33 and 35, and the diode 36. A diode 37 is arranged on the wiring 40. The diode 37 has a forward direction from the voltage input node 31 to the voltage output node 32.

In the power supply circuit 13 with the configuration described above, the voltage level V1 of the DC voltage fed from the power supply 12 may be, for example, 24 V. The voltage level V3 of the output voltage from the DC-DC converter 33 may be, for example, 50 V. The voltage level V2 of the output voltage rom the DC-DC converter 35 may be, for example, 12 V. When a voltage drop caused by the diodes 36 and 37, the wiring, and other factors is neglected, a DC voltage with the voltage level V1 (for example, 24 V) is input into the CPU module 14 and other modules during normal operation, and a DC voltage with the voltage level V2 (for example, 12 V) is input into the CPU module 14 and other modules at a power cut, which will be described later. Thus, the CPU module 14 and other modules are to be operable within a voltage range including the voltage levels V1 and V2.

Example Configuration of DC-DC Converter

Figure 3:
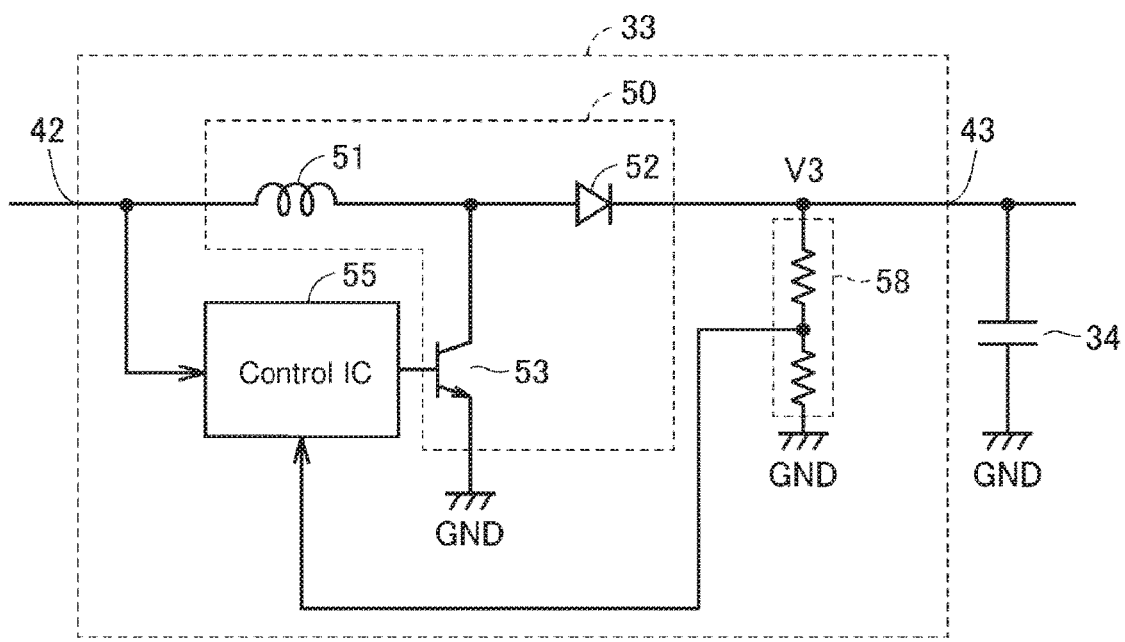
FIG. 3 is a circuit diagram illustrating an example configuration of a step-up DC-DC converter, such as in FIG. 2.

FIG. 3 is a circuit diagram showing an example configuration of the step-up DC-DC converter shown in FIG. 2. As shown in FIG. 3, the DC-DC converter 33 includes a converter circuit 50 for generating a voltage with the voltage level V3, a voltage-dividing circuit 58 for dividing the output voltage from the converter circuit 50, and a control integrated circuit (IC) 55. In FIG. 3, the converter circuit 50 may be a step-up chopper.

More specifically, the converter circuit 50 shown in FIG. 3 includes an inductor 51, a diode 52, and a switching element 53. The inductor 51 and the diode 52 are connected in series in this order between the input node 42 and the output node 43. The diode 52 has its anode connected to the inductor 51. The switching element 53 is connected between a ground GND and a connection node between the inductor 51 and the diode 52. The switching element 53 may be any self turn-off semiconductor switching element. For example, the switching element 53 includes a bipolar power transistor, a power metal oxide semiconductor field effect transistor (MOSFET), and an insulated gate bipolar transistor (IGBT). The diode 52 may be replaced with a switching element for synchronous rectification.

The voltage-dividing circuit 58 is used as a voltage detection unit for detecting the output voltage from the converter circuit 50. The output voltage from the voltage-dividing circuit 58 is input into the control IC 55.

The control IC 55 is driven by the DC voltage input from the voltage input node 31. The control IC 55 regulates the output voltage from the converter circuit 50 by controlling the duty cycle of the switching element 53, which is the ratio of the on-time in the cycle of a pulse width modulation (PWM) signal.

The control IC 55 can also stop the switching operation of the switching element 53 when the voltage-dividing circuit 58 detects that the output voltage from the converter circuit 50 reaches the voltage level V3. When the voltage-dividing circuit 58 detects that the output voltage from the converter circuit 50 decreases below the voltage level V3, the control IC 55 starts switching the switching element 53. This allows the switching element 53 to maintain its non-conductive state when the capacitor 34 functioning as a charger is fully charged, and reduces the power consumption of the converter circuit 50.

Figure 4:
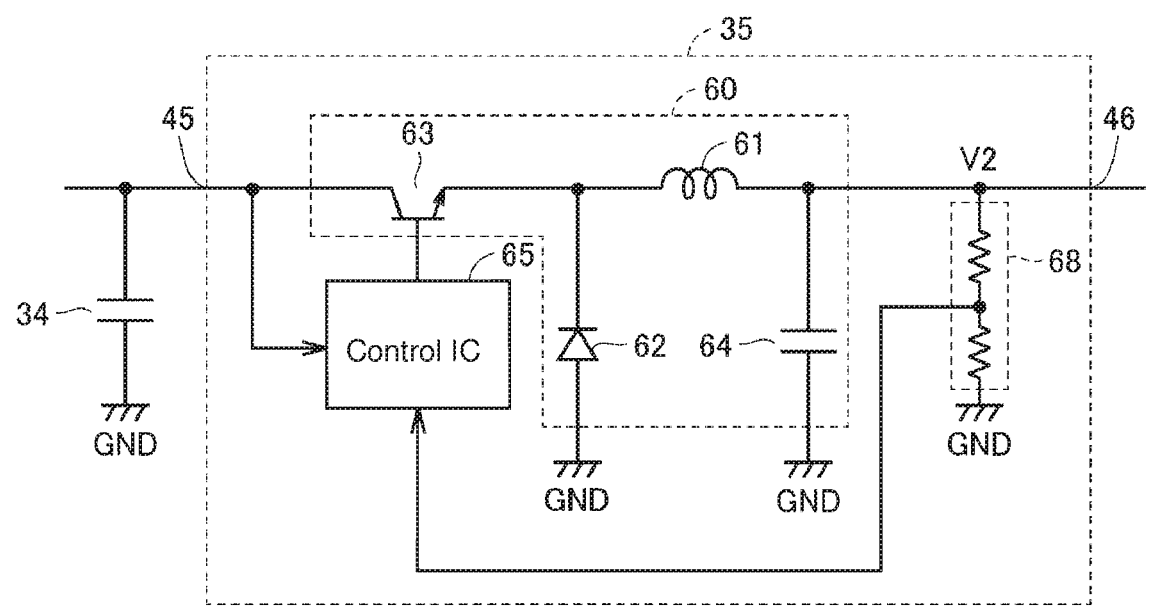
FIG. 4 is a circuit diagram illustrating an example configuration of a step-down DC-DC converter, such as in FIG. 2.

FIG. 4 is a circuit diagram showing an example configuration of a step-down DC-DC converter shown in FIG. 2. As shown in FIG. 4, the DC-DC converter 35 includes a converter circuit 60 for generating a voltage with the voltage level V2, a voltage-dividing circuit 68 for dividing the output voltage from the converter circuit 60, and a control IC 65. In FIG. 4, the converter circuit 60 may be a step-down chopper.

More specifically, the converter circuit 60 in FIG. 4 includes an inductor 61, a diode 62, a switching element 63, and a capacitor 64. The switching element 63 and the inductor 61 are connected in series in this order between the input node 45 and the output node 46. The diode 62 is connected between a ground GND and a connection node between the inductor 61 and the diode 62. The diode 62 has its anode connected to the ground GND. The switching element 63 may be any self turn-off semiconductor switching element. The capacitor 64 is connected between the output node 46 of the converter circuit 60 and a ground GND for smoothing the output voltage. The diode 62 may be replaced with a switching element for synchronous rectification.

The voltage-dividing circuit 68 is used as a voltage detection unit for detecting the output voltage from the converter circuit 60. The output voltage from the voltage-dividing circuit 68 is input into the control IC 65.

The control IC 65 is driven by the voltage discharged from the capacitor 34 functioning as a charger. The control IC 65 regulates the output voltage from the converter circuit 60 by controlling the duty cycle of the switching element 63.

The control IC 65 can also stop the switching operation of the switching element 63 when the voltage-dividing circuit 68 detects that the output voltage from the converter circuit 60 reaches the voltage level V2. When the voltage-dividing circuit 68 detects that the output voltage from the converter circuit 60 decreases below the voltage level V2, the control IC 65 starts switching the switching element 63. This allows the switching element 63 to maintain its non-conductive state when the output voltage from the converter circuit 60 reaches the voltage level V2, which is the target value, during normal operation, while the power supply voltage is being fed from the power supply 12. This reduces the power consumption of the converter circuit 60.

Operation of Power Supply Circuit

The operation of the power supply circuit 13 with the above configuration will now be described below mainly with reference to FIGS. 2 and 5.

Figure 5:
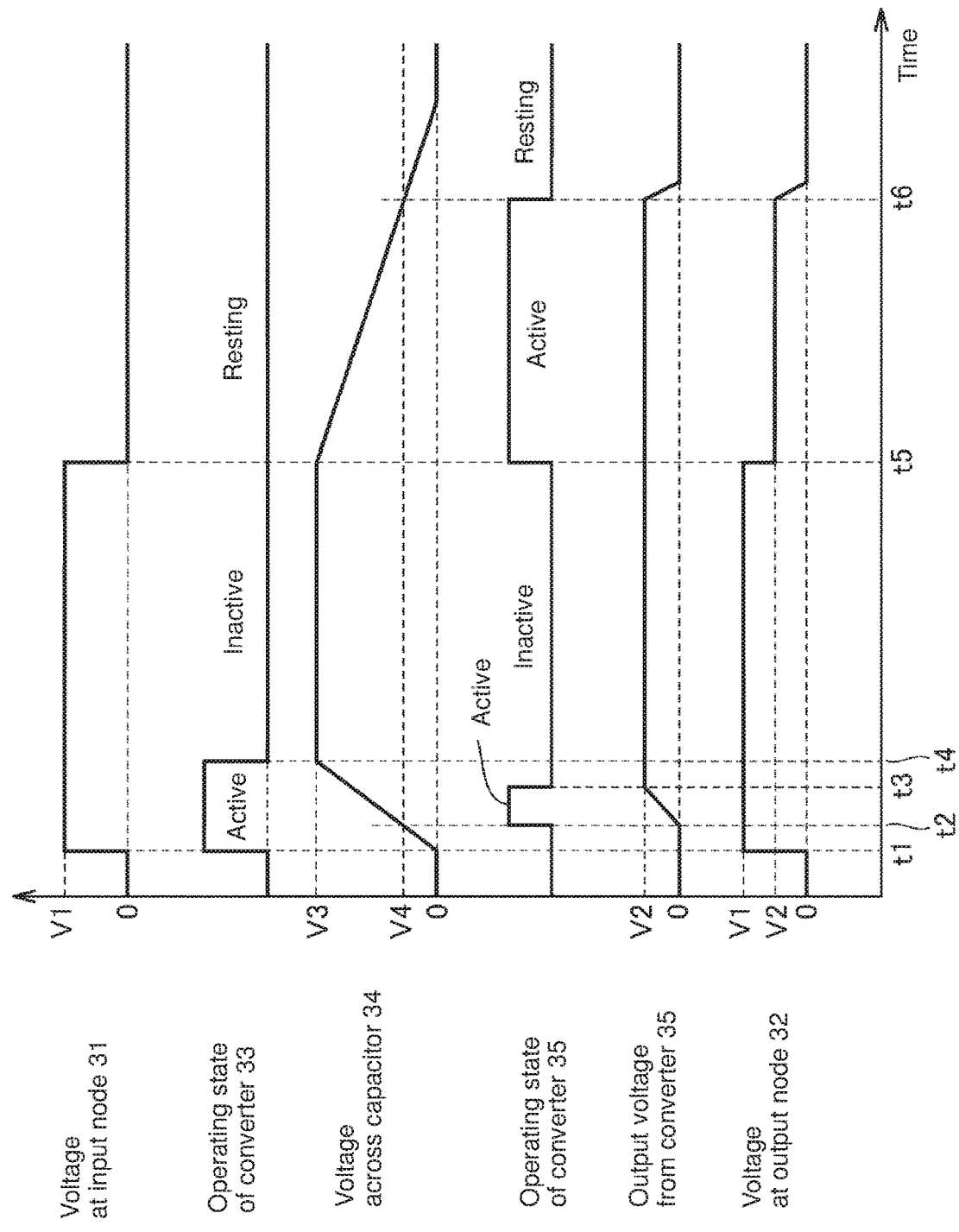
FIG. 5 is a timing chart illustrating an operation of a power supply circuit, such as in FIG. 2.

FIG. 5 is a timing chart describing the operation of the power supply circuit shown in FIG. 2. FIG. 5 shows, from the top, the DC voltage that is fed to the voltage input node 31, the operational state of the DC-DC converter 33, the voltage across the capacitor 34, the operational state of the DC-DC converter 35, the output voltage from the DC-DC converter 35, and the output voltage from the voltage output node 32. The voltage drops in the diodes 36 to 38 in the forward direction are neglected.

The operational state of the DC-DC converter 33 is referred to as an active state when the switching operation of the switching element 53 is performed (in other words, when the DC-DC converter 33 actively outputs a current). The operational state of the DC-DC converter 33 is referred to as an inactive state when the switching element 53 almost stops its switching operation (in other words, when the DC-DC converter 33 outputs almost no current although the circuits including the control IC 65 are operating). Also, the operational state of the DC-DC converter 33 is referred to as a resting state when the circuit of the DC-DC converter 33 is not operating due to, for example, no power supply voltage being fed. The same applies to the DC-DC converter 35.

The operation from time t1 to time t4 in FIG. 5 is the activation operation of the PLC. More specifically, the DC voltage with the voltage level V1 starts being fed to the voltage input node 31 at time t1. This starts the conversion operation of the DC-DC converter 33, and causes the charging voltage in the capacitor 34 to increase gradually from 0 V.

At time t2, the voltage across the capacitor 34 reaches the voltage level V4, at which the control IC (65 in FIG. 4) included in the DC-DC converter 35 is operable. This starts the conversion operation of the DC-DC converter 35, and causes the output voltage of the DC-DC converter 35 to increase gradually.

At time t3, when the output voltage from the DC-DC converter 35 reaches the voltage level V2, which is the target value, the DC-DC converter 35 stops the conversion operation. In other words, the operational state of the DC-DC converter 35 switches from the active state to the inactive state.

At time t4, when the voltage across the capacitor 34 (the output voltage from the DC-DC converter 33) reaches the voltage level V3, the DC-DC converter 33 stops the conversion operation. In other words, the operational state of the DC-DC converter 33 switches from the active state to the inactive state.

At time t4 and later, both the DC-DC converters 33 and 35 are in the inactive state during normal operation (until time t5), in which the power supply voltage is fed from the power supply 12. The capacitor 34 in FIG. 2 and the capacitor 64 in FIG. 4 each actually have a leakage current. Thus, the DC-DC converters 33 and 35 actually enter the active state intermittently, and then switch back to the inactive state when the output voltage reaches the target voltage.

The DC voltage with the voltage level V1, which is output from the voltage output node 32 to the CPU module 14 and other modules, is larger than the voltage level V2 of the output voltage from the DC-DC converter 35. In FIG. 2, the diode 37 is in a conducting state, whereas the diode 36 receiving a reverse bias voltage is in a non-conducting state. The voltage at the voltage output node 32 is thus equal to the voltage level V1 during normal operation, in which the power supply voltage is fed from the power supply 12 (from time t1 to time t5).

The operation of the power supply circuit 13 performed at a power cut will now be described. At time t5, the DC voltage input to the voltage input node 31 from the power supply 12 in FIG. 1 is cut, or in other words, the converter is in a power cut state. In this state, the diode 37 in FIG. 2 receives a reverse bias voltage, and thus enters the non-conducting state, whereas the diode 36 enters the conducting state. The path of the power supply voltage to the CPU module 14 and other modules automatically changes from the path from the power supply 12 to the voltage output node 32 through the wiring 40 to the path from the capacitor 34 to the voltage output node 32 through the DC-DC converter 35.

After this automatic change of the path, the voltage across the capacitor 34 gradually decreases at time t5 and later to feed the power supply voltage to the CPU module 14 and other modules. The DC-DC converter 35 then enters the active state in which the converter continuously performs the voltage conversion operation. At time t5 and later, the DC voltage with the voltage level V2 that is output from the DC-DC converter 35 is thus output from the voltage output node 32.

At the power cut, no power supply voltage is fed to the control IC (55 in FIG. 3). At time t5 and later, the DC-DC converter 33 is thus in the resting state with no operation being performed.

At time t6, the voltage across the capacitor 34 decreases below the voltage level V4, at which the control IC (65 in FIG. 4) included in the DC-DC converter 35 is operable. The DC-DC converter 35 then stops the conversion operation, and enters the resting state. As a result, the output voltage from the DC-DC converter 35 decreases to 0 V.

In this manner, after the power cut, the power supply circuit 13 feeds the power supply voltage to the CPU module 14 and other modules during the period from time t5 to time t6, in which the CPU module 14 can back up data as appropriate.

Advantageous Effects

In the PLC 10 according to one or more embodiments, the DC-DC converter 33 included in the power supply circuit 13 performs the voltage conversion operation mainly until the charging voltage of the capacitor 34 reaches the target voltage level V3 during activation. The DC-DC converter 35 also performs the voltage conversion operation mainly until the charging voltage of the capacitor 34 reaches the target voltage level V2 during activation. During normal operation, in which the power supply voltage is fed from the power supply 12, the DC-DC converters 33 and 35 are in the inactive state, in which they do not perform the voltage conversion operation for the most time. This reduces the power consumption of the power supply circuit 13, and thus reduces the space to be used by the power supply circuit 13.

Further, the PLC 10 according to one or more embodiments automatically changes, at a power cut, the path of the power supply voltage to the CPU module 14 and other modules from the path from the power supply 12 to the voltage output node 32 through the wiring 40 to the path from the capacitor 34, which is a power supply for data backup, to the voltage output node 32 through the DC-DC converter 35. This eliminates the switching control using a control signal, unlike the structure described in Japanese Unexamined Patent Application Publication No. 2014-160377 (Patent Literature 1).

Modifications

The DC-DC converter 33 in FIG. 2 may be eliminated, and a connecting point 44 of the capacitor 34 may be connected to the voltage input node 31 directly or via the diode 38. This structure achieves substantially the same operation as the power supply circuit as described above. In this case, the capacitor 34 is charged with the DC voltage with the voltage level V1 that is fed from the power supply 12 shown in FIG. 1, instead of the voltage raised by the DC-DC converter 33. The capacitor 34 thus needs to have a larger capacity to allow power supply at a power cut for substantially the same period as the structure including the DC-DC converter 33.

The capacitor 34 may be charged with the voltage fed from another power supply, instead of being fed from the power supply 12 through the voltage input node 31. This structure also achieves substantially the same operation as the power supply circuit in one or more embodiments.

The embodiments disclosed herein should be considered to be in all respects illustrative and not restrictive. The scope of the invention is defined by the appended claims, and all changes that come within the meaning and range of equivalency of the claims are intended to fall within the claims.

REFERENCE SIGNS LIST

10 PLC
11 PLC unit
12 power supply
13 power supply circuit
14 CPU module
15 input module
16 output module
17 power cut detection unit
31 voltage input node
32 voltage output node
33 DC-DC converter
34 capacitor
35 DC-DC converter
36, 37, 38, 52, 62 diode
40 wiring
41 current path
50, 60 converter circuit
51, 61 inductor
53, 63 switching element
55, 65 control IC
58, 68 voltage-dividing circuit
GND ground
V1, V2, V3 voltage level

The invention claimed is:

1. A programmable logic controller, comprising:
a control unit configured to control a target device; and
a power supply circuit comprising:
a first node configured to receive a first DC voltage;
a second node configured to output a voltage for driving the control unit;
a first rectifier connecting the first node and the second node, the first rectifier having a forward direction from the first node to the second node;
a charger configured to perform charging and discharging;
a first converter configured to convert a discharging voltage output from the charger into a second DC voltage that is lower than the first DC voltage, and output the second DC voltage;
a second rectifier connecting an output of the first converter and the second node, the second rectifier having a forward direction from the first converter to the second node; and
a second converter that converts the first DC voltage into a third DC voltage that is higher than the first DC voltage, and outputs the third DC voltage to the charger, wherein
the second converter comprises:
a second converter circuit comprising a second switching element and configured to generate and output a DC voltage determined in accordance with a conduction ratio of the second switching element;
a second voltage detection unit configured to detect the third DC voltage; and
a second control circuit configured to:
operate on the first DC voltage, and control a switching operation of the second switching element;
stop the switching operation of the second switching element in response to the third DC voltage reaching a first predetermined level; and
start the switching operation of the second switching element in response to the third DC voltage decreasing below the first predetermined level.

2. The programmable logic controller according to claim 1, wherein
the power supply circuit further comprises a third rectifier connected between the first node and an input of the second converter, the third rectifier having a forward direction from the first node to the second converter.

3. The programmable logic controller according to claim 1, wherein
the charger comprises a capacitor configured to perform charging and discharging.

4. A programmable logic controller, comprising:
a control unit configured to control a target device; and
a power supply circuit comprising:
a first node configured to receive a first DC voltage;
a second node configured to output a voltage for driving the control unit;
a first rectifier connecting the first node and the second node, the first rectifier having a forward direction from the first node to the second node;
a charger configured to perform charging and discharging;
a first converter configured to convert a discharging voltage output from the charger into a second DC voltage that is lower than the first DC voltage, and output the second DC voltage; and
a second rectifier connecting an output of the first converter and the second node, the second rectifier having a forward direction from the first converter to the second node, wherein
the first converter comprises:
a first converter circuit comprising a first switching element and configured to generate and output a DC voltage determined in accordance with a conduction ratio of the first switching element;
a first voltage detection unit configured to detect the second DC voltage; and
a first control circuit configured to:

operate on the discharging voltage output from the charger, and control a switching operation of the first switching element;

stop the switching operation of the first switching element in response to the second DC voltage reaching a second predetermined level; and start the switching operation of the first switching element in response to the second DC voltage decreasing below the second predetermined level.

* * * * *